J. W. SARGENT.

STOP MOTION FOR STEAM ENGINES AND OTHER PRIME MOVERS.

APPLICATION FILED SEPT. 8, 1911.

Reissued Dec. 5, 1911.

13,333.

3 SHEETS—SHEET 1.

WITNESSES.

Chas. W. Eddy.

Edw. H. Adams

INVENTOR.

John W. Sargent per S. Schofield

ATTORNEY.

J. W. SARGENT.

STOP MOTION FOR STEAM ENGINES AND OTHER PRIME MOVERS.

APPLICATION FILED SEPT. 8, 1911.

Reissued Dec. 5, 1911.

13,333.

3 SHEETS—SHEET 2.

WITNESSES.

Chas. W. Eddy.
Edw. L. Adams

INVENTOR.

John W. Sargent
per L. Schoffield
ATTORNEY.

COLUMBIA PLANOGRAPH CO., WASHINGTON, D. C.

J. W. SARGENT:

STOP MOTION FOR STEAM ENGINES AND OTHER PRIME MOVERS.

APPLICATION FILED SEPT. 8, 1911.

Reissued Dec. 5, 1911.

13,333.

3 SHEETS—SHEET 3.

WITNESSES.

Chas. W. Eddy.

Edw. H. Adams

INVENTOR.

John W. Sargent by A. Schofield

ATTORNEY.

COLUMBIA PLANOGRAPH CO., WASHINGTON, D. C.

UNITED STATES PATENT OFFICE.

JOHN W. SARGENT, OF PROVIDENCE, RHODE ISLAND.

STOP-MOTION FOR STEAM-ENGINES AND OTHER PRIME MOVERS.

13,333. Specification of Reissued Letters Patent. Reissued Dec. 5, 1911.

Original No. 989,062, dated April 11, 1911, Serial No. 500,227. Application for reissue filed September 8, 1911. Serial No. 648,405.

*To all whom it may concern:*

Be it known that I, JOHN W. SARGENT, a citizen of the United States, residing at Providence, in the State of Rhode Island, have invented a new and useful Improvement in Stop-Motions for Steam-Engines and other Prime Movers, of which the following is a specification.

The object of my invention is to provide a simple means for automatically causing the supply of steam or other motive fluid to be shut off from the engine, when the latter is caused to run faster than a certain predetermined rate of speed. This result is attained by mounting an inertia hammer on the crosshead in such a manner, that at and below the normal rate of speed, the hammer will move with and remain quiet in relation to the crosshead, and be kept in its normal position by the force of gravity or the equivalent tension of a spring acting in conjunction with a fixed stop which prevents the backward movement of the hammer when the crosshead is moving in one direction; but when overspeeding occurs, the inertia of the hammer is sufficient to cause the same at one end of the stroke, to move forward from the said fixed stop in the direction in which it has been traveling, and as the crosshead comes to a standstill, the hammer will strike with a considerable force to impart movement to a releasing or other mechanism, whereby the throttle valve is caused to close, or the valve gear to come to its zero position of cut off.

Figure 1:
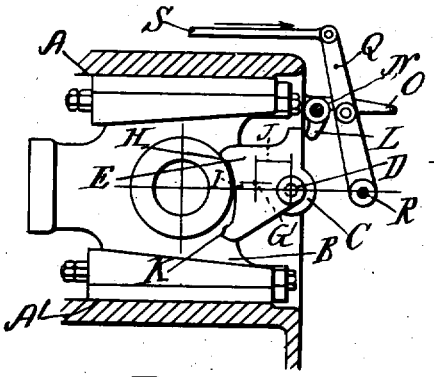
Figure 2:
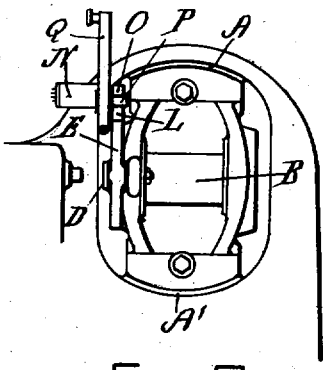
Figure 3:
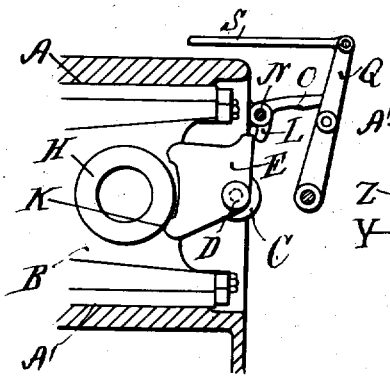
Figure 4:
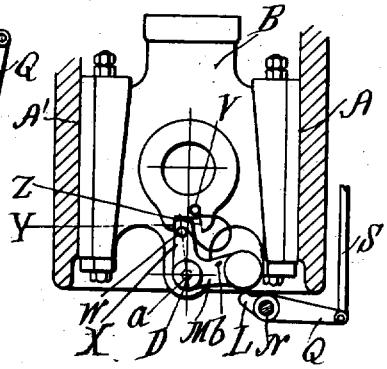
Figure 5:
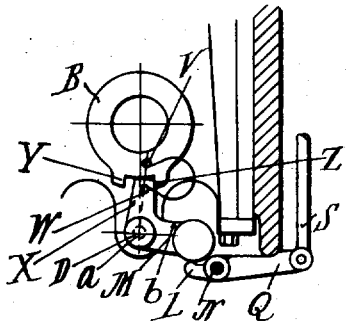
Figure 6:
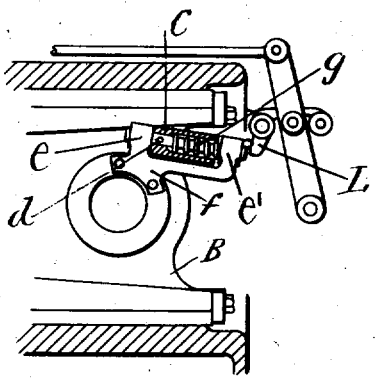
Figure 7:
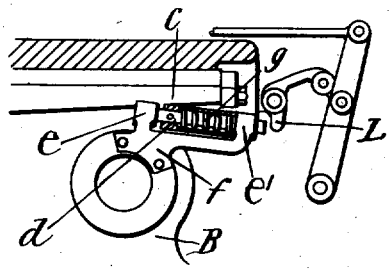
Figure 8:
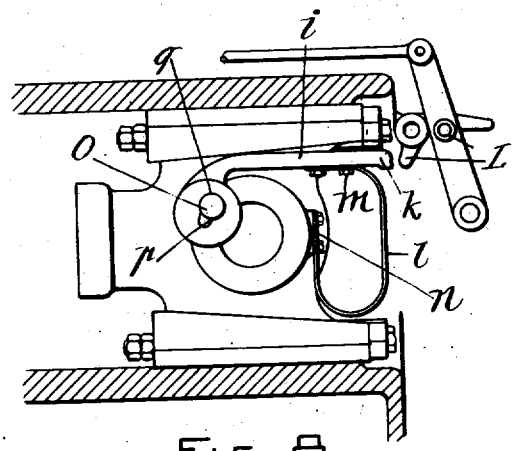
Figure 9:
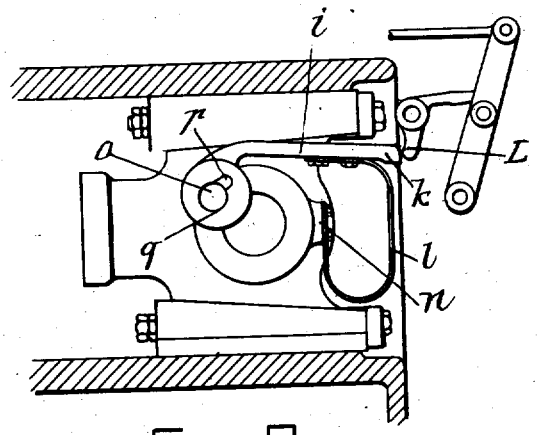

In the accompanying drawings: Figure 1 is a sectional side elevation of the outer end of the slides and crosshead of a horizontal engine, with a gravity stop hammer which embodies my invention, pivoted to the crosshead. Fig. 2 is an end elevation of the same. Fig. 3 is similar to Fig. 1, but shows the stop hammer in action. Fig. 4 shows an arrangement adapted for a vertical engine, where a spring is used to hold the stop hammer in its normal position. Fig. 5 shows the latter arrangement in action. Fig. 6 shows a hammer and sliding hammer mounted in bearings on a bracket attached to the crosshead, with a spiral spring pressing directly against the hammer. Fig. 7 shows the same in action. Fig. 8 shows a stop hammer attached directly to the spring. Fig. 9 shows the same in action.

In each case the crosshead is shown at its extreme outer position from the cylinder.

Referring now to Figs. 1, 2 and 3, which show a simple hammer pivoted to the crosshead of a horizontal engine; A and A′ are the slides in the engine bed. B is the cross head having an arm C carrying a pin D on which the stop hammer E is pivoted. In the normal running of the engine the hammer rests down for a stop against the hub of the crosshead at H. The center of gravity G′ of the hammer E, must be so located that at a certain predetermined rate of speed, the inertia of the weight will overcome the action of gravity and cause the hammer to turn forward on its pivot D. As the hammer E thus turns to strike the blow its center of gravity rises and the leverage increases, causing more rapid action until its full motion is acquired, and to limit the forward movement, the hammer E strikes against the crosshead hub at K. As an example of the existing conditions, when we have an engine of 4 feet stroke making 100 revolutions per minute, the inertia of any piece on the crosshead at the end of the stroke is nearly seven times its own weight in pounds. The inertia increases from the zero point at mid stroke so that for this particular engine; in order to have the stop hammer come into action slightly before the end of the stroke, at say 105 revolutions, the ratio of the inertia leverage I, to the gyratory leverage J, would have to be about one to eight. Before the end of the return stroke of the engine the stop hammer turns back to its normal position shown in Fig. 1 and at, or nearly at the end of the forward stroke it turns again forward to the working position shown in Fig. 3. The stop hammer will keep up this vibratory action while the engine is running at a rate which is above the predetermined speed, and when the normal rate of speed is recovered, the stop hammer will cease to vibrate, and will remain quiet in relation to the crosshead. Various methods may be employed to utilize this striking movement of the stop hammer to shut off the supply of steam to the engine, such as a latch releasing mechanism, shown in Figs. 1, 2 and 3, where a vertical arm L in front of the stop hammer E, is pivoted to the bed plate at N, and has a horizontal latch arm O, which in normal running engages with the square block P, projecting from the rocker Q. This rocker Q is pivoted to the bed plate at R, and at its upper end is connected by means of a link S to the throttle valve or cut off mechanism of an engine. The link S, is strained by a weight or spring in the direction of the arrow, as shown in Fig. 1, so that when the latch O, releases the block P, the rocker Q immediately moves to the position shown in Fig. 3, and the supply of steam to the engine is shut off.

In a pivoted arrangement especially adapted to vertical engines, as shown in Figs. 4 and 5, the hammer M, is shown in the form of a bell crank lever, and is held in its normal position by means of a spring T, one end of which is pivoted to the pin V, on the crosshead, and the other end to the pin W, on an arm X of the hammer M. The arm X moves in action between the stops Y and Z of the crosshead, and is held by the spring T forwardly against the stop Y. In the normal running position of the hammer, the spring T has a leverage *a*, on the hammer, as shown in Fig. 4. But when in full action the leverage is at zero as shown in Fig. 5. In this arrangement the center of gyration is at *b*, being much farther out from the center line of the pivot D, than in the arrangement shown in Figs. 1, 2 and 3, so that the hammer will move quicker. It is obvious that this arrangement is also well adapted to a horizontal engine.

Figs. 6 and 7, show a sliding stop hammer arrangement, where a spiral spring acts directly against the hammer. The spring should have a large initial compression in proportion to its working movement, in order to get a prompt action of the hammer. The weight *c* tightly fits the hammer *d* and is pinned thereto the said hammer being made to rest freely in bearings *e e'* of the bracket *f*, attached to the crosshead. The spring *g* in compression fits loosely in the annular space around the hammer, and in normal running holds the weight *c* hard against the stop bearing *e*. The end of the hammer *d* just clears the arm L, and when the acceleration of the engine is sufficient to overcome the tension of the spring, the hammer *d* moves forward, so that the weight *c* comes against the bearing *e'* and the end of the hammer *d* strikes the lever L, thus causing the release of the cut-off mechanism. The line through the bearings of the hammer *d* is made on an incline, for the purpose of relieving the bearings *e e'*, of friction at the instant of the hammer's action. In the example of the before mentioned engine where the inertia is about seven times the weight of the stop hammer, in pounds, it is obvious that if the incline is 1 in 7, the hammer will be practically afloat. In these two views, Figs. 6 and 7, a toggle releasing mechanism is shown.

In Figs. 8 and 9 the hammer is attached at *m*, directly to a flat spring *l*, which latter is firmly secured to the crosshead at *n*. A pin *o* projecting from the crosshead through a slot *p* in the hammer acts as a stop for the hammer *i* in both directions, and has a safety collar *q* at its outer end, for the purpose of holding the stop hammer to the crosshead in case the spring should break. In normal running the spring *l* holds the hammer *i* against the stop pin *o*, as shown in Fig. 8. When the acceleration is sufficient, the end *k* of the hammer *i* moves forward and strikes the arm L for the release of the cut-off mechanism. At the same time the free movement of the spring *l*, causes the end of the hammer *i* to rise as well as to move forward, until it is stopped at the end of the slot *p* as shown in Fig. 9. This upward movement of the heavy end of the stop hammer, gives it a greater leverage upon the spring, so that with a considerable initial tension in the spring, the increasing leverage of the hammer will offset the increasing tension of the spring during the striking movement. In the two views Figs. 8 and 9 a latch releasing mechanism is shown.

I claim as my invention:

1. In a motive engine, the combination of a reciprocating member having a uniform travel of accelerated and retarded motion, a valve actuating mechanism, and an inertia hammer positively controlled in one direction by a stop on the said reciprocating member, but which by an increase in the speed of the engine beyond a certain predetermined limit is caused to move in the opposite direction automatically forward by its own inertia beyond the normal limit of its motion with the said reciprocating member and strike a hammer blow upon a portion of the valve actuating mechanism to cut off the supply of motive fluid.

2. In a motive engine, the combination of a reciprocating member having a uniform travel of accelerated and retarded motion, an inertia hammer pivoted to said member with its center of gyration out of line with the center of motion and held in normal position by gravity, whereby when the speed of the engine exceeds a certain predetermined limit, the inertia hammer will be caused to rise and strike a hammer blow independently of the reciprocating member, to shut off the supply of motive fluid from the engine.

JOHN W. SARGENT.

Witnesses:

SOCRATES SCHOLFIELD,
BENJAMIN L. DENNIS.

Copies of this patent may be obtained for five cents each, by addressing the "Commissioner of Patents, Washington, D. C."